Jan. 12, 1954  E. RAWSON  2,665,663
SUSPENDED MILKER
Filed Jan. 11, 1949  3 Sheets-Sheet 1
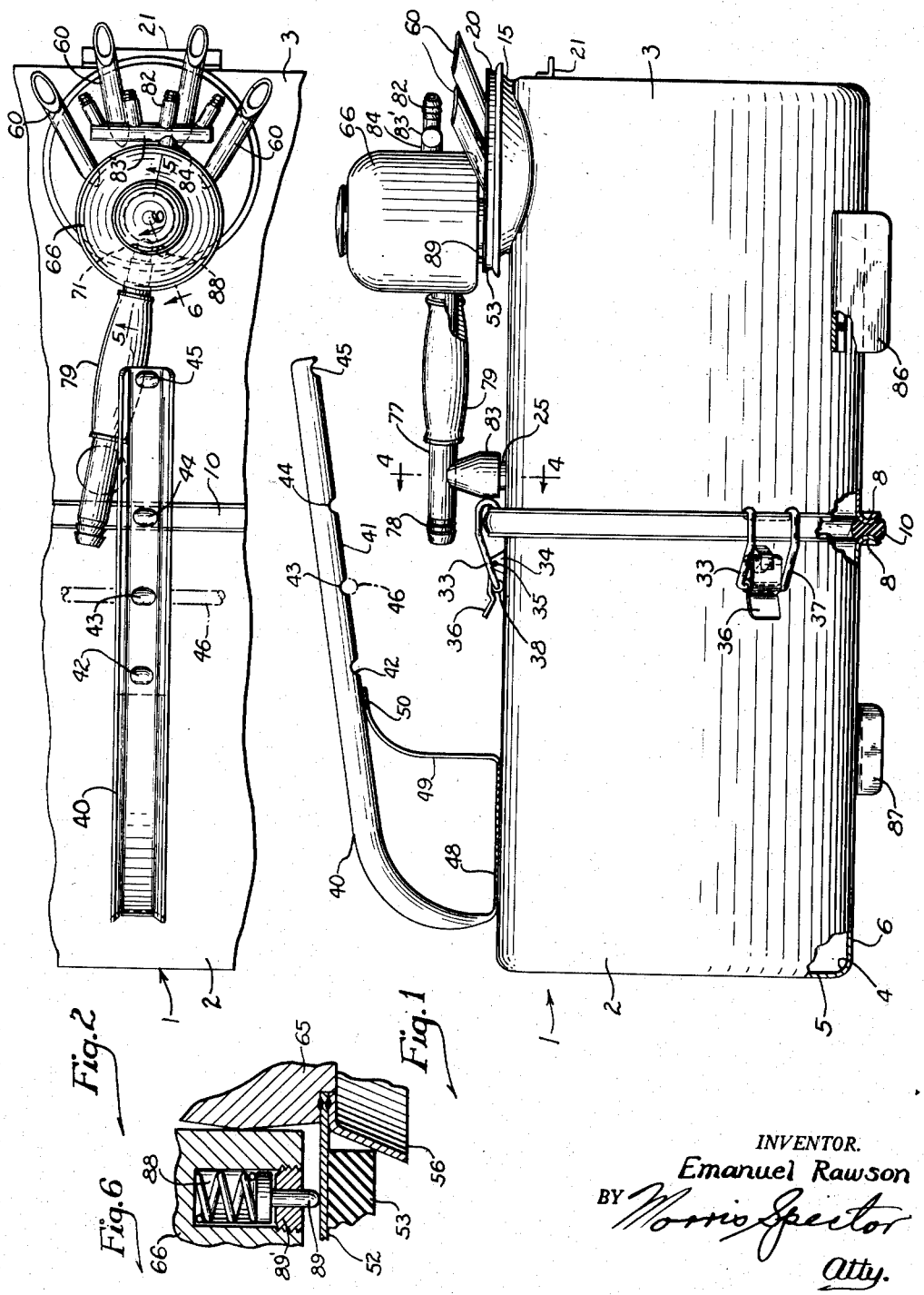
INVENTOR.
Emanuel Rawson
BY Morris Spector
Atty.

Jan. 12, 1954 E. RAWSON 2,665,663
SUSPENDED MILKER
Filed Jan. 11, 1949 3 Sheets-Sheet 2
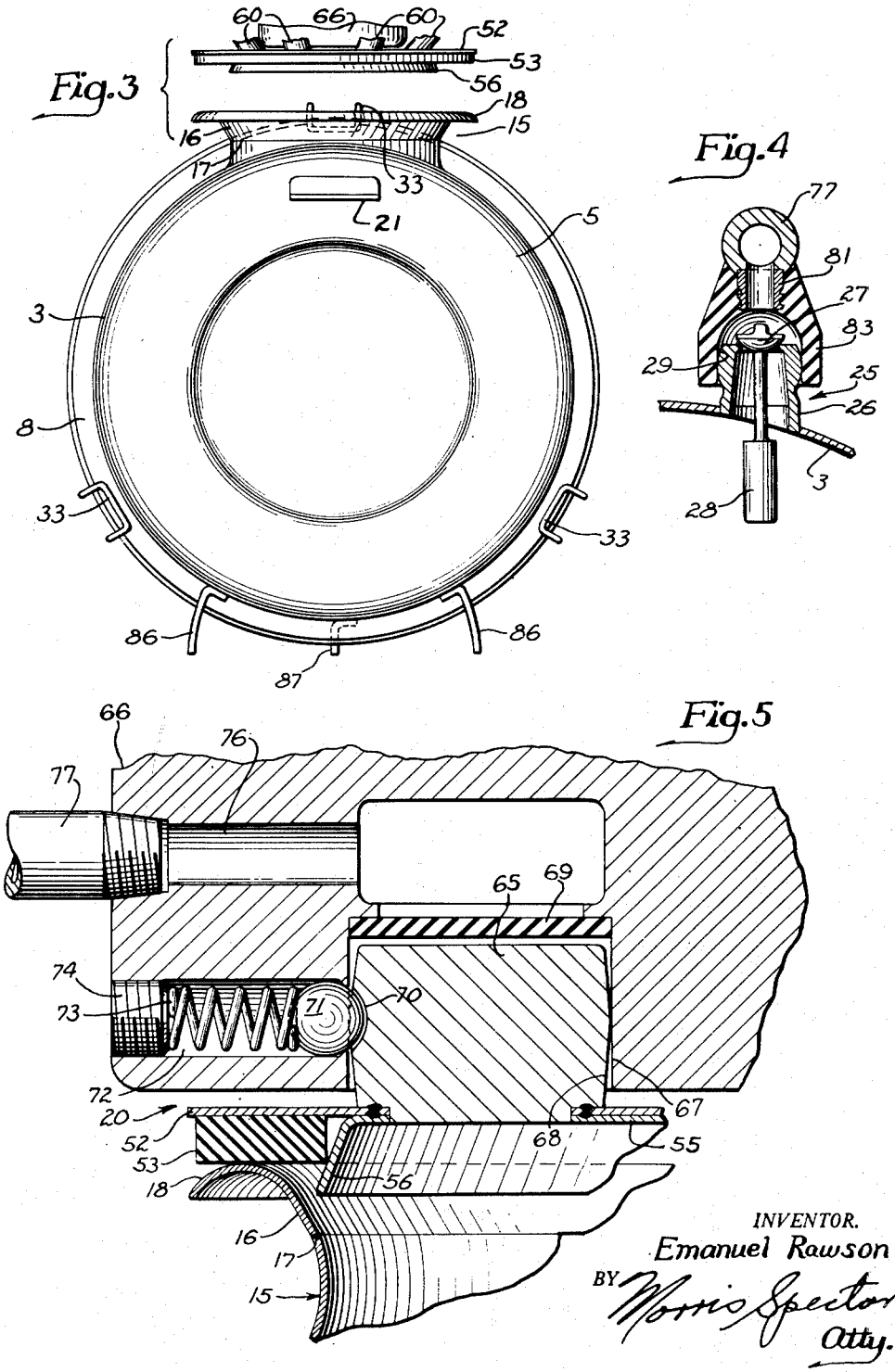
INVENTOR.
Emanuel Rawson
BY Morris Spector
Atty.

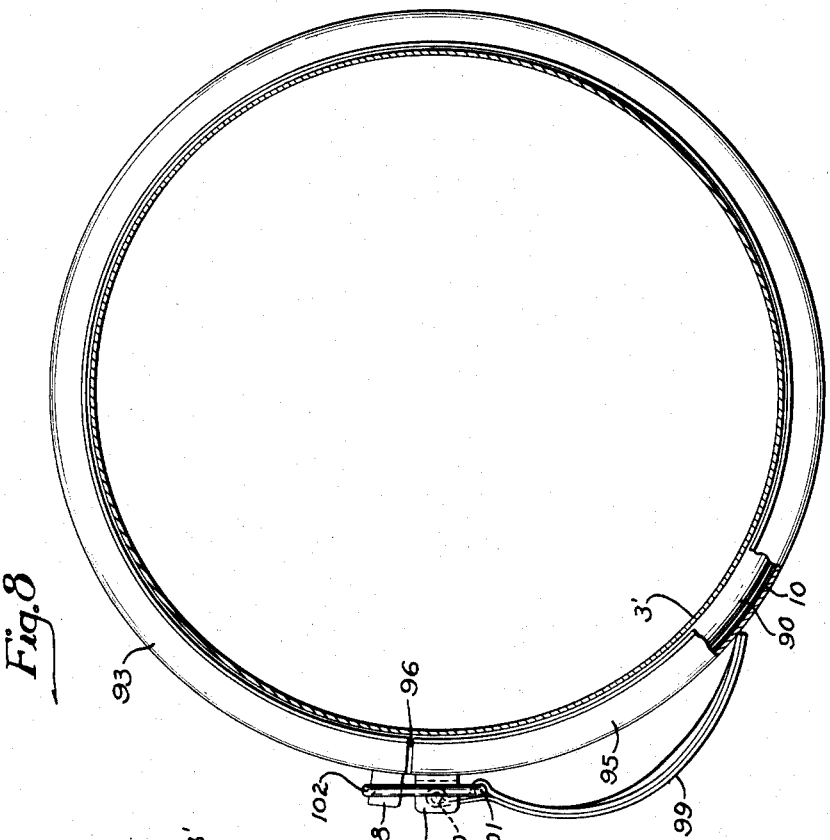
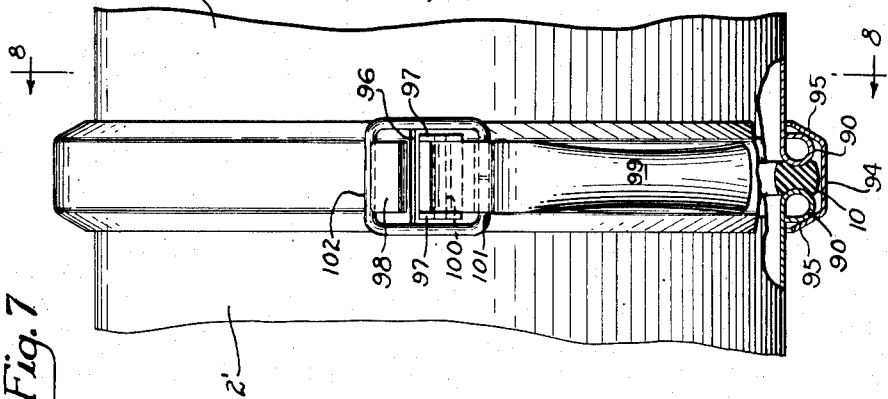

Patented Jan. 12, 1954

2,665,663

UNITED STATES PATENT OFFICE 2,665,663

SUSPENDED MILKER

Emanuel Rawson, Chicago, Ill., assignor, by mesne assignments, to Package Machinery Company, a corporation of Massachusetts Application January 11, 1949, Serial No. 70,300

8 Claims. (Cl. 119—14.4)

This invention relates to suspended milkers such as are used in vacuum type milking installations and, more particularly, to the milk receiving receptacle that is adapted to be suspended beneath a cow during milking.

It is one of the objects of the present invention to provide a milk receiving receptacle for suspended milkers, which receptacle shall be so constructed and arranged as to facilitate thorough cleaning thereof.

Heretofore such receptacles have consisted of a rather large diameter body in order to give the same the requisite volume within a short height. This is objectionable because the larger the diameter of the receptacle the greater the difficulty imposed upon the dairyman in bringing the receptacle into position beneath the cow. This involves a difficulty not only in hanging of the receptacle beneath the cow but also in bringing the receptacle into position in the cow stall in conventional dairy barns. This is due to the fact that the space between cow stalls in dairy barns is made as narrow as possible consistent with ease of getting the cow into the space. That does not allow an excessive amount of clearance space between a cow in a stall and the stall limits to permit a man with a very wide receptacle to enter conveniently. Another and very important difficulty arising from the use of a large diameter receptacle is that once the receptacle is suspended beneath a cow the large diameter thereof brings it into a position where it is easily kicked by the cow. As a result there is considerable damage to wide receptacles resulting from kicking thereof by the cow. This is in addition to other difficulties that arise when a cow that is being milked kicks the milk receptacle, namely, possibilities of injuring the cow, frightening the cow, and spilling the milk. Another great difficulty that is found in using large diameter receptacles is that the removable cover must be of rather small diameter to avoid gasketing problems in a vacuum milker, and this involves providing the receptacle with a top that is an integral part of the receptacle body and which top is provided with a reduced diameter opening constituting the pour-out opening, which receives a cover plate when the apparatus is in use, the cover plate being of very much smaller diameter than the diameter of the receptacle. It is difficult to keep such receptacles clean. The under side of the top of the receptacle is never exposed to view and there is, therefore, a tendency for the dairyman to neglect cleaning it. It is one of the objects of the present invention to provide a receptacle particularly adapted for use as a suspended milker, which receptacle is so arranged that it can be separated for cleaning purposes, the arrangement being such that when the receptacle is separated all of the interior surfaces that ever come into contact with the milk are exposed to view for inspection and are in a position for easy and quick cleaning.

It is a further object of the present invention to provide a suspended milker receptacle which comprises two substantially similar deep drawn metal containers releasably secured together with their open ends juxtaposed to produce a single receptacle. In view of the fact that the containers are formed by a deep drawn process it is possible to avoid sharp points. The two containers are of substantially identical construction so that a single set of dies suffice for both of them. Such containers are easy to clean.

The milk receptacle of the present invention is of substantially greater length than height. The pulsator mechanism and milk line receiving nozzles are necessarily located adjacent to one end of the receptacle so as to bring them as close as possible to the udder of the cow during milking operation and thereby permit the use of rubber milk tubes of minimum length. The tilting of the receptacle during the milking operation causes the milk to flow towards the end of the receptacle where the pulsator is located and may sometimes bring the level of the milk above the bottom of the lowest portion of the top of the inclined receptacle. It is therefore necessary to provide means for preventing suction of milk from the receptacle into the vacuum line that is connected thereto when the receptacle is tilted in this manner. In the embodiment of the present invention herein illustrated this object of invention is obtained by connecting the vacuum line to the receptacle at a point adjacent to the center of the receptacle so that tilting of the receptacle is not likely to bring the milk level up to the point where the vacuum line opens into the receptacle. This arrangement permits the use of a receptacle that is much longer in relation to its depth than was heretofore possible.

It is a further object of the present invention to provide a milk receptacle and a pulsator attachment arrangement such that the pulsator may be attached to a pour-out spout at one end of the receptacle, and the vacuum line connection established to the receptacle at a point considerably spaced from the pour-out spout and yet allow for a single plug-in connection between the receptacle and the pulsator and vacuum line.

By this arrangement it is never possible for milk to be sucked into the pulsator.

It is a still further object of the present invention to provide a milking receptacle with a pulsator receiving cover so arranged that the cover has considerable play across the opening that is closed thereby to permit movement of the cover with the pulsator thereon into a position required for establishing vacuum plug-in connections to the container body at a place remote from the cover while the cover itself remains in effective closing position.

It is a still further object of the present invention to provide a milk receptacle that has a pourout opening, with a cover that is slidable across the opening and has means for receiving and holding a pulsator. It is a still further object of the present invention to provide a pulsator with spring locking means that will hold the pulsator in position and at the same time will permit easy removal thereof.

In milkers of the type here involved the cover for the milk receiving pulsator has four milk line nozzles that are connected to the respective milk hoses from the four inflations. During the time that the milk receptacle is being carried from one position to another, in the process of milking, the inflations and the inflation shells hang by the rubber hoses from the nozzles on the cover of the milk receptacle. This exerts a pull on the cover tending to tilt the cover to its open position. It is one of the objects of the present invention to provide a cover in a milker of the above mentioned type with means providing a releasable anchor or lock for preventing tilting of the cover under the weight of the inflations and yet which will permit manual opening of the cover by merely pulling upwardly thereon.

The attainment of the above and further objects of the present invention will be apparent from the following specification taken in conjunction with the accompanying drawings forming a part thereof.

In the drawings:

Figure 1 is a side view of a suspended milker, with certain parts thereof broken away;

Figure 2 is a fragmentary top view of the milker of Figure 1;

Figure 3 is a right hand end view of the milker container of Figure 1, with the pour-out spout cover elevated from the spout;

Figure 4 is a sectional view taken along the line 4—4 of Figure 1 and looking in the direction of the arrows;

Figure 5 is an enlarged fragmentary sectional view taken along the line 5—5 of Figure 2;

Figure 6 is a fragmentary sectional view taken along the line 6—6 of Figure 2;

Figure 7 is a fragmentary front view of an alternate means of clamping the two containers together; and Figure 8 is a sectional view taken along the line 8—8 of Figure 7.

Reference may now be had more particularly to the drawings wherein like reference numerals designate like parts throughout.

The receptacle of the present invention is indicated in general by the reference numeral 1, and includes two similar cylindrical containers 2—3. Each of the containers 2—3 is a deep drawn stainless steel container, circular in cross section. The containers are of identical size so that the same dies can be used for making both containers substantially to completion. The interior of each of the two containers is smooth and substantially devoid of sharp corners, such as would hold dirt and be difficult to clean. To that effect the juncture 4 between the end 5 and the cylindrical body 6 is along a smooth curve. At its outer end each container has a smooth curl 8 extending outwardly around the entire periphery of the opening and entirely seamless so that the entire outer surface of the curl 8 is perfectly smooth for receiving a gasket 10, of rubber or similar gasketing material, which seals around the curl.

The container 3 has a pour-out opening or spout 15 formed in the cylindrical wall thereof adjacent the end wall 5. The pour-out spout 15 is circular in shape and is formed by piercing and drawing the metal of the cylindrical wall of the container outwardly. Where the metal is of insufficient thickness to permit drawing the same outwardly for the full extent necessary for forming the spout, there is provided a stainless steel sheet metal ring 16 which is welded to the spout portion 15 along a smooth line of weld 17. The ring 16 is provided at its top with an outward smooth curl 18 that extends around the entire periphery of the ring. This constitutes the milk receiving opening and also the pour-out opening for the receptacle. The opening of the pour-out spout is adapted to be closed by a cover 20 which will be later described. An angle iron ledge 21 is welded to the end 5 of the container 3 to be used in supporting one end of the milker on a milk receiving can as milk is being poured from the receptacle 1 through the spout 15.

A gravity actuated check valve 25, shown more particularly in Figure 4, is provided on the container 3. The check valve consists of a ring fitting 26 that fits into and is soldered in a hole in the cylindrical wall of the container 3, and provides at its upper end a seat for a gravity actuated check valve spindle 27 having a stem 28. The ring fitting 26 is spherically shaped at its upper end 29. The ball of the check spindle normally rests on the seat of the fitting 26 to keep the check valve closed. Vacuum within the container 3 helps to keep the check valve closed. If there is a preponderance of pressure below the check spindle 27 compared to that above the same, as seen in Figure 4, the check valve opens in a manner usual in the operation of a check valve. The spindle is removable through the fitting 26 for cleaning.

The open ends of the containers 2 and 3 are juxtaposed, with the rubber sealing gasket ring 10 between them, and they are then clamped together to form a single receptacle. The clamping may be accomplished in any desired manner. In the present instance there has been shown a series of three clasps 33 spaced 120° apart and each secured to the container 2. Each of the clasps 33 consists of a plate 34 welded to the container 2 and forming a pivotal support at 35 for a hand lever 36 in which is swiveled a looped wire hook member 37 that swings about a pivot axis 38 that is part of the lever 36. The hook member 37 is adapted to hook under the curl 8 of the container 3. When the lever 36 is in the position illustrated in Figure 1 the clasps draw the two containers towards one another and firmly press the curls 8 of the two containers towards the opposite surfaces of the ring gasket 10. When the lever 36 is swung in a clockwise direction from the position illustrated in Figure 1 it permits the hook portion of the wire 37 to release from the curl 8 of the container 3 and permit separation of the two containers.

A metal handle 40 is welded or otherwise permanently secured to the outside of the container 2. The handle includes a carrying bar 41 which may be gripped by the hand to carry the entire receptacle, or which may be suspended from a surcingle to hold the receptacle in position beneath a cow during milking. To facilitate suspension of the milker between the cow, the carrying bar 41 has a number of notches 42, 43, 44 and 45 formed therein so that the carrying bar may be positioned on a surcingle rod 46 at any one of the notches 42–45 in such a manner as to permit tilting of the receptacle about the center of the rod 46. As seen in Figure 1, the axis of tilt of the receptacle 1 would pass through the center of the surcingle rod 46 in a direction at right angles to the plane of the container. The receptacle is suspended from the surcingle with the closed end of the container 3 facing in the direction of the teats of the cow and with the longitudinal axis of the receptacle extending lengthwise of the cow. It is to be noted that the bar 41 extends beyond the open end of the container 2 and that the last notch 45 is a considerable distance beyond the open end of the container 2. This is provided for the purpose of allowing a wide range of variations in the point of support of the receptacle from the surcingle, and permit varying the magnitude of pull on the cow's teats as the milking proceeds and the receptacle fills. The carrying bar 41 itself is of a generally arch shape in cross section to give it the necessary strength consistent with lightness of weight and to make it convenient to grip the carrying bar 41 for carrying the receptacle. One end of the carrying bar is flattened and bent so that a portion thereof can lie along the cylindrical surface 2, as indicated at 48, where it is welded to the container, and the end is bent upwardly, as indicated at 49, the upper part 50 of which is welded to the lower side of the carrying bar 41 for strengthening purposes.

As previously stated, the container 3 has a pour-out spout 15 which is adapted to be covered by the cover 20. The cover 20 consists of a circular stainless steel disc 52 on the under side of which is secured a ring gasket 53 of rubber or other suitable sealing material. The gasket 53 is adapted to rest on the curl 18. On the under side of the disc 52 there is welded or otherwise suitably secured a circular metal plate 55 having a downwardly and outwardly extending flange 56 around its periphery, which flange is adapted to engage the ring 16 for limiting the extent of sliding movement of the lid 20 across the pour-out spout 15 on the curl 18. To that extent the outside diameter of the flange 56 is appreciably less than the inside diameter of the ring 16 at the distance below the top of the curl 18 where the flange engages the ring. This allows a permissible freedom of motion of the lid 20 across the open top of the spout to the extent of approximately one-quarter of an inch. The lid is held on the curl 18 by gravity and by vacuum within the receptacle. When the vacuum is released within the receptacle the pour-out spout may be uncovered by merely lifting upwardly on the lid 20.

The lid 20 has four milk line receiving, tubular nipples 60. Each nipple opens through the disc 52 and the plate 55 of the cover for discharging the milk into the receptacle. The cover 20 has a solid pulsator-receiving post 65 welded thereto and extending upwardly therefrom, the post making a sealing fit at the disc 52 so that there is no leakage of air through the cover around the post. The post 65 is circular in cross section and is adapted to receive and releasably hold a vacuum type milking machine pulsator 66. The pulsator may be of any preferred construction. A suitable pulsator is shown in the patent to McArthur, et al. No. 2,419,844. The pulsator has a cylindrical bore 67 at the base thereof for receiving the mounting post. The mounting post is preferably tapered above and below the median line thereof, as indicated at 68—69. This permits tilting of the pulsator about the post. A removable sealing gasket 69, of rubber or the like, closes the bore 67 of the pulsator immediately above the post 65. In order to assure releasably holding the pulsator on the post 65, against accidental displacement therefrom, the pulsator is provided with a spring lock that cooperates with an indentation 70 on the post. The lock includes a spring detent in the form of a ball 71 that is held in a bore 72 in the pulsator and pressed toward the indentation 70 by a coiled spring 73 that bears at one end against the ball 71 and at the opposite end against a closure plug 74 that is screw threaded into the end of the bar 72. The pulsator has a main vacuum bore 76 in which is threaded a vacuum line conduit 77 that is preferably in the form of a rigid metal pipe or tube and that is formed at one end 78 to receive the end of a rubber vacuum line hose. At its other end, adjacent to the pulsator 66, it preferably has a handle 79 formed on the outside thereof so that by gripping the handle 79 the pulsator and the parts connected therewith, including the cover 20, can be lifted, as will be described more fully as this description proceeds. The vacuum line conduit 77 has a branch nipple 81 formed therein which is surrounded by a fitting or connector parts 83, preferably of rubber. The fitting or connector parts 83 is adapted to be seated on the vacuum line receiving connector ring fitting 26 by being pushed manually thereover, being at that time tensioned by the connector fitting 26, and may be removed therefrom by pulling upwardly on the fitting or connector 83 through an upward pull on the vacuum line conduit 77. The connector fitting 26 and the connector part 83 constitute two cooperating connector parts of a vacuum line connector for the milk receptacle.

The pulsator has, as a part thereof, four nipples 82 each for receiving a vacuum hose that goes to the outer shell of one of the four teat cups of the inflations. The four nipples 82 open into a connecting tube 83' that is connected to the pulsator by a tube 84. The pulsator is arranged to apply vacuum to the four nipples 82 followed by the application of atmospheric pressure to those nipples, and to repeat this action continuously. At the same time vacuum is continuously applied through the nipples 60 to the inflation hoses connected thereto, in the manner usual in the milking art.

In order to hold the receptacle against rolling when it is placed on the ground with its longitudinal axis horizontal, as illustrated in Figure 1, the container 3 is provided with a pair of supporting legs 86—86 that are welded to the outside thereof and the container 2 is provided with a similar supporting leg 87. This gives a three point support for the receptacle.

During the time that the milker is carried from one position to another in the milking operations, the hoses from the four inflations and inflation shells are connected to the nipples 60 and to the nipples 82, respectively, and the inflations and inflation shells hang downwardly from the nipples. The weight thus supported from the nipples tends to tilt the cover 20. A tension device, shown more particularly in Figure 6, is provided for exerting a spring pressure tending to resist tilting of the cover 20 with respect to the pulsator and thereby utilizing the gripping force of the rubber connector 83 on the ring fitting 26. To this effect the pulsator body is provided at its under side with a bore 88 that receives a spring which presses against a plunger 89 that is slidable in a retaining ring 89' threaded into the bottom of the bore 88. The plunger bears against the cover plate 52 and thus urges the pulsator to one angular position with respect to the vertical axis of the post 65. Any tendency for the pulsator to rise on the post 65, as distinguished from tilting, under the action of the spring pressed plunger 89 is prevented by the spring pressed ball 71 (Fig. 5) which ball, however, does not prevent tilting of the pulsator. Any tendency of the cover to tilt would exert a force tending to cause the pulsator also to tilt as a unit with the post 65 because of the spring pressed plunger 89. This is resisted by the resilient grip of the fitting 83 on the fitting 26 that is rigid with the container 3.

A description will now be given of the manner of using the milker thus far described. The two clean receptacles 2—3 are fastened together with the sealing gasket ring 10 between them. At this time the spout 15 of the container 3 is uncovered and the pulsator is not in position. Thereafter the hose from the four teat cups and from the shells are connected to the milk line receiving nipples 60 and the vacuum nipples 82, and the pulsator is snapped into position on the post 65 of the lid 20. The handle 79 is then gripped, and the pulsator and lid assembly are then positioned on the receptacle by lowering the handle 79 until the fitting 83 comes into position on the vacuum line receiving connector or ring fitting 26 and the lid comes into position on the spout. By pressing down on the handle 79 the fitting 83 is plugged into position on the fitting 26. During this time the spring pulsator lock in the pulsator holds the cap 20 assembled with the pulsator. The amount of play between the cover 20 and the spout, as permitted by the ring flange 56, obviates the need of extreme precision in locating the fitting 26 on the container 3. The spherical shape 29 of the fitting 26, and the tapered arrangement 68—69 on the post 65 allows the securing of a good fit without requiring parallelism of the axis of the fitting 26 with respect to the axis of the post 65. With the equipment thus assembled the dairyman then positions the milker of Figure 1 beneath a cow to be milked, by hanging the handle bar 41 from a surcingle rod 46 that is placed on the cow in the usual manner. One suitable surcingle and means for suspending a milker therefrom is shown in the patent to McCornack, No. 1,859,213, to which reference may be had. With the milker thus suspended from a cow the dairyman can then raise the four inflations that are hanging from the nipples 60 and 82, one at a time, and position them on the teats of a cow. During the time that the inflations are hanging downwardly from the nipples 60 they close off the nipple openings in a manner usual in the art, as shown, for instance, in the aforesaid McCornack patent.

When the milking of a cow has been completed and the milker has been removed from the cow and the inflations on the nipples 60 hang downwardly therefrom, it is an easy matter to empty the receptacle. After the vacuum line conduit 77 has been disconnected from the vacuum line in the dairy barn the check valve 27 closes so that vacuum is maintained in the receptacle 1. If it is desired to empty the receptacle the inside of the receptacle is brought to atmospheric pressure as, for instance, by raising one of the inflation tubes on a nipple 60 and thereby permitting atmospheric air to enter the receptacle through the nipple 60. Thereafter the dairyman holding the receptacle 1 in one hand by the handle bar 40 grips the handle 79 of the pulsator and pulls upwardly thereon. This removes the pulsator from the receptacle, said pulsator carrying the connector 83 with it and the cap 20. This leaves the pour-out spout 15 open. The dairyman then places the holding flange 21 on the open top of the usual milk receiving can and pours the contents of the receptacle through the spout 15. Thereafter he can lower the handle 79 back to the position illustrated in Figure 1, replacing the pulsator on the receptacle and reestablishing the coupling between the vacuum line receiving connector 25 and the fitting or connector 83, all by a single operation, and may then proceed to milk the next cow in the usual manner.

Reference may now be had to Figures 7 and 8 wherein there is illustrated an alternate way of securing the receptacles 2 and 3 together without the use of clasps secured to either of the two receptacles. In this instance the receptacles are indicated in fragmentary form at 2' and 3', corresponding respectively to the receptacles 2 and 3 of Figure 1. The clasps 33 of Figure 1 are omitted. The ends of the receptacles 2' and 3' are provided with beads 90—90 in lieu of the curls 8—8 of Figure 1. Each bead is formed by curling the end of the cylindrical wall to form a closed loop, as is usual in the can or receptacle making art. The two receptacles are clamped together, compressing the rubber gasket 10, by a split spring metal ring 93 which is of an inwardly facing channel shaped section and includes a web portion 94 and two flanges 95—95 that are each at an obtuse angle to the web. The ring is split at 96 and has a pair of lugs 97—98 welded to the opposite ends thereof. A clasp 99 is pivoted to the lug to pivot about a pin 100, and provides a pivot support 101 for a wire ring or loop 102 that is adapted to be hooked over the lug 98. When the loop 102 is off of the lug 98 the split ring may be easily expanded to permit positioning of the ring over the bead 90 of one of the containers. The gasket 10 is then positioned in place and the bead 90 of the other container is then positioned in place. Thereafter the loop 102 is positioned on the lug 98 and then the clasp 99 is swung to the position illustrated in Figure 7, thereby drawing the two ends of the split ring towards one another and wedging the beads 90—90 towards one another between the flanges 95—95 to secure the two containers 2'—3' together and form a liquid tight seal between them.

While I have herein shown two different ways of securing the two containers together, it is within the purview of the present invention to use other securing means without departing from the spirit of the present invention.

It is obvious from the above description that when the receptacle is empty the two containers may readily be separated. Each container then is similar to an open bucket which may easily be cleaned. There are no ledges on the inside of the container that are hidden from view and which may become dirty by reason of negligent cleaning operations.

It is also to be noted that whenever the pulsator assembly is lifted off of the receptacle the bottom of the fitting 83 is open to atmosphere and this allows the drainage and escape of moisture that may have accumulated in the rubber hose that is connected to the vacuum line conduit 77.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A milk receptacle comprising a cylindrical body open at one end and having a pour-out opening in the cylinder shaped portion of the body, a cover for said opening, said cover having milk line nipples extending therefrom, a milking pulsator having means for connection to teat cups, means for releasably mounting said pulsator on the cover, a vacuum line receiving conduit operatively connected to the pulsator, a pair of cooperating plug-in type vacuum type connector parts mounted one on the vacuum line conduit of the pulsator and one on the cylindrical body adjacent to the open end thereof, said connector parts being separable from one another by removal of the pulsator from the cover, and a check valve mounted on that connector part which is mounted on the cylindrical body and remaining with that last mentioned connector part upon separation of the two connector parts.

2. A milk receptacle comprising a generally cylindrical body open at one end and closed at the opposite end and having a pour-out opening adjacent the closed end, a cover for said opening, said cover having milk line nipples extending therefrom, a milking pulsator having means for connection to teat cups, means for releasably mounting said pulsator on the cover, a vacuum line receiving conduit operatively connected to the pulsator, a plug-in type vacuum connector including two parts mounted one on the vacuum line conduit of the pulsator and one on the cylindrical body adjacent to the open end thereof, said connector parts being separable from one another by removal of the pulsator from the cover, and a check valve mounted on that connector part which is mounted on the cylindrical body and remaining with that last mentioned connector part upon separation of the two connector parts.

3. A milk receptacle having a pour-out opening, a cover for said opening, said cover having milk line nipples extending therefrom for connection to milking inflations of a vacuum milker, a milking pulsator having means for connection to teat cups, means for releasably mounting said pulsator on the cover, a vacuum line receiving conduit operatively connected to the pulsator, and a pair of cooperating plug-in type vacuum type connector parts mounted one on the vacuum line conduit of the pulsator and one on the cylindrical body adjacent the open end thereof a check valve for that connector part which is mounted on the cylindrical body, said check valve being spaced from and independent of the other connector part so that on separation of the cooperating connector parts the check valve remains with the connector part that is on the cylindrical body, said vacuum line receiving conduit being a rigid tube constituting a handle for manipulating one of the plug-in connector parts and for positioning the pulsator.

4. A milk receptacle for suspension beneath a cow in a vacuum type cow milking operation, said receptacle comprising two open ended containers with their open ends face to face and secured together, said receptacle having a pulsator receiving support adjacent to one end thereof, a cantilever handle for suspending the receptacle, said handle being secured to one container and overlying the other container, and a vacuum line receiving connector part on said receptacle and spaced from said pulsator support in a direction towards the handle and towards the juncture of the two containers.

5. A milk receptacle for suspension beneath a cow in a vacuum type cow milking operation, said receptacle having a pulsator receiving support adjacent to one end thereof, a handle therefor for suspending the receptacle, a vacuum line receiving connector part on the receptacle and opening thereinto at a location spaced from said pulsator support in a direction towards the handle, a pulsator positioned on said pulsator receiving support, a vacuum line conduit operatively connected to the pulsator and extending from the pulsator outside of the receptacle, and a plug-in type vacuum coupling between said conduit and said connector part.

6. A milk receptacle for suspension beneath a cow in a vacuum type cow milking operation, said receptacle having a pulsator receiving support adjacent to one end thereof, a handle therefor for suspending the receptacle, a vacuum line receiving connector part on the receptacle and opening thereinto at a location spaced from said pulsator support in a direction towards the handle, a pulsator positioned on said pulsator receiving support, a rigid vacuum line conduit operatively connected to the pulsator extending from the pulsator outside of the receptacle, a plug-in type vacuum coupling between said conduit and said connector part, and spring means for tensioning the pulsator on the support to cause the vacuum line conduit which is held by the coupling to act through the pulsator and resiliently hold the pulsator support against tilting.

7. A milk receptacle for a vacuum type milker, a pulsator receiving support on the receptacle, said receptacle having a vacuum line receiving connector part opening thereinto at a location spaced from the support, a pulsator positioned on said pulsator receiving support, a vacuum line conduit extending from the pulsator outside of the receptacle, a plug-in type vacuum coupling operatively connecting said conduit and said connector part, and a check valve which is independent of the conduit end of the coupling so that the valve remains with the connector part on the receptacle on separation of the plug-in coupling.

8. A milk receptacle comprising a generally cylindrical body open at one end and closed at the opposite end and having a pour-out opening adjacent the closed end, a cover for said opening, said cover having milk line nipples extending therefrom, a milking pulsator having means for connection to teat cups, said pulsator releasably mounted on the cover, a vacuum line receiving conduit operatively connected to the pulsator, and means operatively connecting said vacuum line conduit to said body at a location adjacent to the open end thereof for extending vacuum to the interior of said receptacle.

EMANUEL RAWSON.

References Cited in the file of this patent

UNITED STATES PATENTS

| Number | Name | Date |
|---|---|---|
| 1,210,818 | Lindstrom | Jan. 2, 1917 |
| 1,326,078 | Matthews | Dec. 23, 1919 |
| 1,392,346 | McCornack | Oct. 4, 1921 |
| 1,432,075 | Mallu | Oct. 17, 1922 |
| 1,457,155 | Fey | May 29, 1923 |
| 1,506,321 | Oakes | Aug. 26, 1924 |
| 1,538,732 | Oden | May 19, 1925 |
| 1,538,736 | Oden | May 19, 1925 |
| 1,816,482 | Hapgood | July 28, 1931 |
| 1,859,213 | McCornack | May 17, 1932 |
| 2,190,081 | Pfauser | Feb. 13, 1940 |
| 2,244,939 | Carlson | June 10, 1941 |
| 2,284,180 | Thomas | May 26, 1942 |
| 2,329,396 | Dinesen | Sept. 14, 1943 |
| 2,340,297 | Schmitt et al. | Feb. 1, 1944 |
| 2,460,856 | Stanke et al. | Feb. 8, 1949 |
| 2,508,960 | McArthur et al. | May 23, 1950 |

FOREIGN PATENTS

| Number | Country | Date |
|---|---|---|
| 319,415 | Germany | Feb. 21, 1919 |